(12) United States Patent
Wang et al.

(10) Patent No.: US 11,743,482 B2
(45) Date of Patent: *Aug. 29, 2023

(54) VIDEO IMAGE PROCESSING METHOD AND DEVICE

(71) Applicant: SZ DJI TECHNOLOGY CO., LTD., Shenzhen (CN)

(72) Inventors: Suhong Wang, Beijing (CN); Xiaozhen Zheng, Shenzhen (CN); Shanshe Wang, Beijing (CN); Siwei Ma, Beijing (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,902

(22) Filed: Nov. 15, 2021

(65) Prior Publication Data

US 2022/0078466 A1  Mar. 10, 2022

Related U.S. Application Data

(63) Continuation of application No. 17/060,001, filed on Sep. 30, 2020, now Pat. No. 11,178,420, which is a
(Continued)

(51) Int. Cl.
*H04N 19/176* (2014.01)
*H04N 19/513* (2014.01)
(Continued)

(52) U.S. Cl.
CPC ......... *H04N 19/513* (2014.11); *H04N 19/12* (2014.11); *H04N 19/136* (2014.11); *H04N 19/176* (2014.11); *H04N 19/587* (2014.11)

(58) Field of Classification Search
None
See application file for complete search history.

(56) References Cited

U.S. PATENT DOCUMENTS 6,480,546 B1  11/2002  Kim et al.
10,362,330 B1  7/2019  Li et al.
(Continued)

FOREIGN PATENT DOCUMENTS

CN  101188772 A  5/2008
CN  101350928 A  1/2009
(Continued)

OTHER PUBLICATIONS

Hahyun Lee, et al., CE4-related: Fixed sub-block size and restriction for ATMVP, Joint Video Experts Team (JVET) of ITU-T SG 16 WP 3 and ISO/IEC JTC 1/SC 29/WG 11, JVET-L0468-v2, 12th Meeting: Macao, CN, Oct. 2018, pp. 1-4.
(Continued)

*Primary Examiner* — Christopher G Findley
(74) *Attorney, Agent, or Firm* — Anova Law Group, PLLC

(57) ABSTRACT

A video image processing method includes determining a current image block; in response to a size of the current image block not meeting a first preset condition, skipping an advanced/alternative temporal motion vector prediction (ATMVP) operation so that a temporal candidate motion vector of the current image block is not determined according to the ATMVP operation; and encoding the current image block. The ATMVP operation includes determining a relevant block of the current image block in a temporal neighboring image; dividing the current image block into a plurality of sub-blocks; for each of the sub-blocks, determining a corresponding relevant sub-block in the relevant block; and determining temporal candidate motion vectors of the sub-blocks of the current image block according to motion vectors of the relevant sub-blocks corresponding to the sub-blocks.

17 Claims, 1 Drawing Sheet

Determine a current image block — S110

When a size of the current image block meets a preset condition, determine a temporal candidate motion vector of the current image block according to a temporal motion vector prediction (TMVP) operation and/or an advanced/alternative temporal motion vector prediction (ATMVP) operation — S120

Related U.S. Application Data continuation of application No. PCT/CN2019/070315, filed on Jan. 3, 2019.

(51) Int. Cl.
*H04N 19/12* (2014.01)
*H04N 19/136* (2014.01)
*H04N 19/587* (2014.01)

(56) References Cited

U.S. PATENT DOCUMENTS

| | | | |
|---|---|---|---|
| 11,178,420 B2 * | 11/2021 | Wang | H04N 19/176 |
| 2016/0286232 A1 | 9/2016 | Li et al. | |
| 2016/0366435 A1 | 12/2016 | Chien et al. | |
| 2017/0034512 A1 | 2/2017 | Casula | |
| 2018/0084260 A1 | 3/2018 | Chien et al. | |
| 2018/0199057 A1 | 7/2018 | Chuang et al. | |
| 2020/0077115 A1 | 3/2020 | Li et al. | |
| 2020/0195948 A1 | 6/2020 | Li et al. | |
| 2021/0266589 A1 * | 8/2021 | Chen | H04N 19/52 |

FOREIGN PATENT DOCUMENTS

| | | |
|---|---|---|
| CN | 101573985 A | 11/2009 |
| CN | 101841712 A | 9/2010 |
| CN | 101873500 A | 10/2010 |
| CN | 102148990 A | 8/2011 |
| CN | 102215395 A | 10/2011 |
| CN | 104079944 A | 10/2014 |
| CN | 104935938 A | 9/2015 |
| CN | 106537915 A | 3/2017 |
| CN | 107211156 A | 9/2017 |
| CN | 109076236 A | 12/2018 |
| JP | 2021516502 A | 7/2021 |
| WO | 2018048904 A1 | 3/2018 |
| WO | 2018058526 A1 | 4/2018 |
| WO | 2020004990 A1 | 1/2020 |

OTHER PUBLICATIONS

Jianle Chen, et al., Algorithm Description of Joint Exploration Test Model 7 (JEM 7), Joint Video Exploration Team (JVET) of ITU-T SG 16 WP3 and ISO/IEC JTC 1/SC 29/WG 11, JVET-G1001-v1, 7th Meeting: Torino, IT, Aug. 2017, pp. i-iv,1,13-28.

Suhong Wang, et al., CE4-related: Simplification of ATMVP candidate derivation, Joint Video Experts Team (JVET) of ITU-T SG 16 WP 3 and ISO/IEC JTC 1/SC 29/WG 11, JVET-L0198_r2, 12th Meeting: Macao, CN, Jul. 2019, pp. 1-5.

Hyeongmun Jang, et al., [CE4-2.6 related] Simplified A TMVP with fixed sub-block size., Joint Video Experts Team (JVET) of ITUTSG 16 WP 3 and ISO/IEC JTC 1/SC 29/WG 11, JVET-K0080-v1, Joint Video Experts Team (JVET) of ITU-T SG 16 WP 3 and ISO/IEC JTC 1/SC 29/WG 11, Jul. 2018, pp. 1-5.

Yi-Wen Chen, and Xianglin Wang, AHG5: Reducing WC worst-case memory bandwidth by restricting bi-directional 4x4 inter CUs/Sub-blocks, Joint Video Experts Team (JVET) of ITU-T SG 16 WP 3 and ISO/IECJTC 1/SC 29/WG 11, JVET-L0104, 12th Meeting: Macao, CN, Sep. 2018, pp. 1-3.

Suhong Wang et al., CE4-related: Remove redundancy between TMVP and ATMVP, Joint Video Experts Team (JVET) of ITU-T SG 16 WP 3 and ISO/IEC JTC 1/SC 29/WG 11, JVET-M0345_v2, 13th Meeting: Marrakech, MA, Jan. 2019, pp. 1-5.

The World Intellectual Property Organization (WIPO) International Search Report for PCT/CN2019/070315 dated Sep. 27, 2019 5 pages.

The World Intellectual Property Organization (WIPO) International Search Report for PCT/CN2019/077893 dated Sep. 16, 2019 5 pages.

Zhichu He, et al., "Framework of AVS2-Video Coding", ICIP2013, Feb. 13, 2014, p. 1515-1519.

Kuan Yuan, et al., "A New Transform Structure for Geometry Motion Partitioning in Video Coding", Journal of Shanghai University, vol. 19, No. 3, Jun. 2013, p. 240-244.

* cited by examiner

VIDEO IMAGE PROCESSING METHOD AND DEVICE

CROSS-REFERENCE TO RELATED APPLICATIONS

This application is a continuation of application Ser. No. 17/060,001, filed on Sep. 30, 2020, which is a continuation of International Application No. PCT/CN2019/070315, filed Jan. 3, 2019, the entire contents of both of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to video encoding and decoding field, and more particularly, to a video image processing method and a device.

BACKGROUND

At present, a main video coding standard adopts a block-based motion compensation technology in an inter-frame prediction part. The main principle of the block-based motion compensation technology is finding a most similar block in an encoded image for a current image block, and this process is called motion compensation. For example, a frame of image is divided into coding tree units (CTUs) of equal size, e.g., the size is 64×64 or 128×128. Each CTU may be further divided into square or rectangular coding units (CUs). A most similar block is found for each CU in a reference frame as a predicted block of the current CU, where the reference frame is usually a reconstructed frame near a current frame in a time domain. A relative displacement between the current block (i.e., the current CU) and the similar block (i.e., the predicted block of the current CU) is called a motion vector (MV). The process of finding the most similar block in the reference frame as the predicted block of the current block is motion compensation.

In a current merge prediction mode, a merge candidate list of the current CU is usually constructed in two ways. One way is determining a candidate motion vector in a spatial domain, which usually includes filling motion information of an encoded neighbouring block of the current CU into the candidate list. The other way is determining a candidate motion vector in a time domain. Temporal motion vector prediction (TMVP) uses motion information of a co-located CU, i.e., a CU at a corresponding position in an encoded neighbouring image of the current CU. An optimal candidate motion vector is then selected from the merge candidate list as the motion vector of the current CU, and the prediction block of the current CU is determined according to the motion vector of the current CU.

Advanced/alternative temporal motion vector prediction (ATMVP) is a motion vector prediction mechanism with a basic idea of performing the motion compensation by acquiring the motion information of a plurality of sub-blocks in the current CU. The ATMVP technology introduces the motion information of the plurality of sub-blocks in the current CU as candidates during the construction of a candidate list, e.g., a merge/affine candidate list or an AMVP candidate list. A realization of the ATMVP technology may roughly include two steps. At the first step, a time domain vector is determined by scanning the candidate motion vector list of the current CU or the motion vectors of the neighbouring image blocks of the current CU. At the second step, the current CU is divided into N×N (N defaults to 4) sub-blocks (sub-CU), a corresponding block of each sub-block in a reference frame is determined according to the time domain vector obtained in the first step, and the motion vector of each sub-block is determined according to the motion vector of each corresponding block in the reference frame.

There is still room for improvement in the current TMVP technology and ATMVP technology.

SUMMARY

In accordance with the disclosure, there is provided a video image processing method including determining a current image block and, in response to a size of the current image block meeting a preset condition, determining a temporal candidate motion vector of the current image block according to at least one of a temporal motion vector prediction (TMVP) operation or an advanced/alternative temporal motion vector prediction (ATMVP) operation. The TMVP operation includes determining a relevant block of the current image block in a temporal neighboring image and determining the temporal candidate motion vector of the current image block according to a motion vector of the relevant block. The ATMVP operation includes determining the relevant block of the current image block in the temporal neighboring image, dividing the current image block into a plurality of sub-blocks, determining a corresponding relevant sub-block in the relevant block for each of the sub-blocks, and determining temporal candidate motion vectors of the sub-blocks of the current image block according to motion vectors of the relevant sub-blocks corresponding to the sub-blocks.

DETAILED DESCRIPTION OF THE EMBODIMENTS

Figure 1:
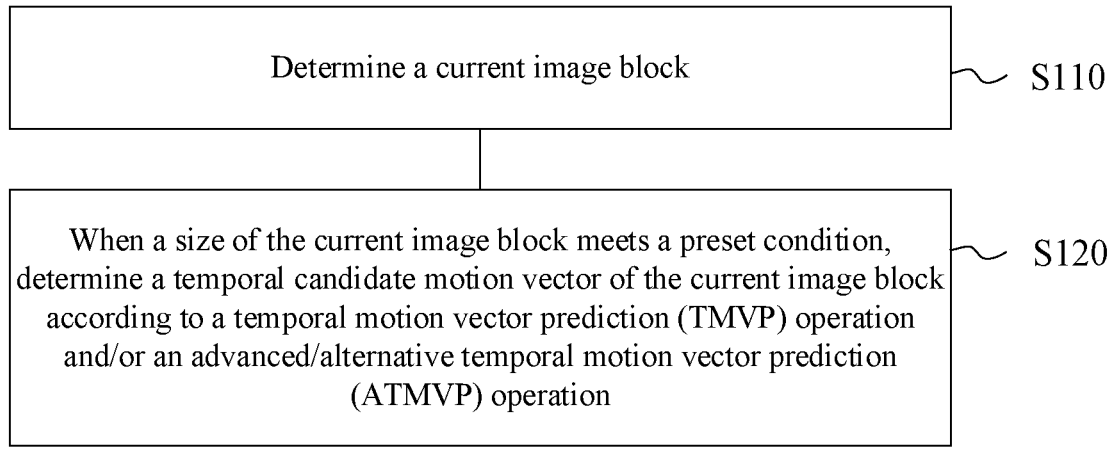
FIG. 1 is a schematic flowchart of a video image processing method according to one embodiment of the present disclosure.

In video encoding and decoding, a prediction process is used to reduce redundant information in an image. A prediction block refers to a basic unit used for prediction in a frame of image. In some standards, the prediction block is also referred to as a prediction unit (PU). Before a frame of image is encoded/compressed, it is divided into a plurality of image blocks. Each image block of the plurality of image blocks can be further divided into a plurality of image blocks, and so on. In different coding methods, the number of division levels can be different, and corresponding operation methods performed are also different. In different coding standards, names of image blocks on a same level may be different. For example, in some video standards, each of a plurality of image blocks that a frame of image is divided into for the first time is referred to as a coding tree unit (CTU). Each coding tree unit may include a coding unit (CU) or may be further divided into a plurality of coding units. A coding unit can be divided into one, two, four or other numbers of prediction units according to a prediction method. In some video standards, the coding tree unit is also referred to as a largest coding unit (LCU).

Prediction refers to finding image data similar to the prediction block and such image data is also referred to as a reference block of the prediction block. A difference between the prediction block and the reference block of the prediction block is encoded/compressed to reduce redundant information during encoding/compression. The difference between the prediction block and the reference block may be a residual obtained by subtracting corresponding pixel values of the prediction block and the reference block. The prediction includes intra prediction and inter prediction. The intra prediction refers to finding the reference block of the prediction block in the frame where the prediction block is located. The inter prediction refers to finding the reference block of the prediction block in other frames except the frame where the prediction block is located.

In some video standards, the prediction unit is the smallest unit in the image and is not further divided into a plurality of image blocks. However, an "image block" or a "current image block" described below refers to a prediction unit (or a coding unit), and an image block can be further divided into a plurality of sub-blocks, and prediction can be further performed on each sub-block.

In the present disclosure, a motion vector candidate list is constructed before a current image block is predicted, and the prediction is performed according to a selected candidate motion vector from the motion vector candidate list. The motion vector candidate list includes different types of modes, and examples of the different types of modes are described below.

In a first type of mode, at an encoder side, after a motion vector candidate list is constructed, encoding of a current image block can be realized through the following processes.

A best motion vector is selected from the motion vector candidate list and denoted as MV1. The selected MV1 is used as the motion vector of the current image block, and an index of MV1 in the motion vector candidate list is obtained.

According to the motion vector MV1 of the current image block, a predicted image block of the current image block is determined from a reference image (i.e., a reference frame). That is, a position of the predicted image block of the current image block in the reference frame is determined.

A residual between the current image block and the predicted image block is obtained.

The index of the motion vector MV1 of the current image block in the motion vector candidate list and the residual obtained in the process described above are sent to a decoder side.

At the decoder side, the current image block can be decoded through the following processes.

The residual and the index of the motion vector of the current image block in the motion vector candidate list are received from the encoder side.

The motion vector candidate list is obtained through the method according to the embodiments of the present disclosure. The motion vector candidate list obtained by the decoder side is consistent with the motion vector candidate list obtained by the encoder side.

According to the index, the motion vector MV1 of the current image block is obtained from the motion vector candidate list.

The predicted image block of the current image block is obtained according to the motion vector MV1, and then the current image block is obtained by decoding based on the predicted image block and the residual.

In the first type of mode, the motion vector of the current image block is equal to motion vector prediction (MVP). In some embodiments, the first type of mode includes a merge mode and/or an affine merge mode.

In a second type of mode, a difference from the first type of mode is that after the encoder side selects a best motion vector MV1 from the motion vector candidate list, the encoder side also uses MV1 as a search starting point to perform a motion search, and records a displacement between a finally located position and the search starting point as a motion vector difference (MVD). The predicted image block of the current image block is determined from the reference image according to the motion vector MV1 and the MVD. The encoder side also sends the MVD to the decoder side. In some embodiments, the second type of mode is also referred to as AMVP mode (i.e., normal inter-frame prediction mode).

Construction methods of motion vector candidate lists in different types of modes can be same or different. Motion vector candidate list constructed through a same method can be applied to only one type of mode or different types of modes, which is not limited here.

In accordance with the disclosure, motion vector candidate lists obtained through two construction methods are provided. For the convenience of description, the motion vector candidate lists obtained through two construction methods are referred to as a first motion vector candidate list and a second motion vector candidate list. One difference between the two lists is that at least one candidate in the first motion vector candidate list includes a motion vector of a sub-block, and each candidate in the second motion vector candidate list includes a motion vector of an image block. As described above, the image block is a same type as the current image block, referring to a prediction unit (or a coding unit). The sub-block refers to one of a plurality of sub-blocks obtained by dividing the image block. When a candidate in the first motion vector candidate list is used for prediction, a reference block of the current image block is determined according to the candidate, and then a residual between the image block and the reference block is calculated. When a candidate in the second motion vector candidate list is used for prediction, if the candidate selected is a motion vector of a sub-block, a reference block is determined for each sub-block in the current image block according to the candidate, and a residual between each sub-block in the current image block and the corresponding reference block is calculated. The residuals of all sub-blocks are stitched to form a residual of the current image block.

The current image block is an image block to be encoded (or decoded). An image frame where the current image block is located is referred to as a current frame. For example, the current image block is a coding unit (CU).

In some embodiments, the second motion vector candidate list of the current image block can be applied to the above-described first type of mode, e.g., the merge candidate list or the AMVP candidate list. For example, the second motion vector candidate list may be a normal merge list in the merge candidate list. It should be noted that the second motion vector candidate list can also have other names.

It should be noted that the first motion vector candidate list and the second motion vector candidate list formed through the construction methods provided in the disclosure can be applied to the encoder side and the decoder side. That is, the methods provided in this disclosure can be executed by the encoder side or the decoder side.

In some embodiments, during determination of candidates in the first motion vector candidate list and/or the second motion vector candidate list, one of the candidates can be determined according to the TMVP operation and/or the ATMVP operation.

In some embodiments, during construction of the first motion vector candidate list, the motion vector determined according to the ATMVP operation can be added to the list as a candidate (e.g., as a first candidate). During constructing the second motion vector candidate list, the method may add the motion vector determined according to the TMVP operation to the list as a candidate.

In some embodiments, the TMVP operation includes determining a relevant block of a current image block in a temporal neighboring image, and determining a temporal candidate motion vector of the current image block according to a motion vector of the relevant block.

In some embodiments, the ATMVP operation includes determining a relevant block of a current image block in a temporal neighboring image, dividing the current image block into a plurality of sub-blocks, determining a relevant sub-block corresponding to each sub-block in the relevant block, and determining a temporal candidate motion vector of the sub-block of the current image block according to a motion vector of the relevant sub-block corresponding to each sub-block.

In some embodiments, the temporal neighboring image described in the TMVP operation and the ATMVP operation can be a reference image with a closest temporal distance to the image where the current image block is located. In some embodiments, the temporal neighboring image can be a reference image preset by the encoder/decoder side. In some embodiments, the temporal neighboring image can be a specified reference image of the current image block in a video parameter set, a sequence header, a sequence parameter set, an image header, an image parameter set, a slice header. For example, the temporal neighboring image may be a co-located frame of the current image block. The co-located frame is a frame set in a slice-level information header for obtaining motion information for prediction. In some scenarios, the co-located frame is also referred to as a collocated picture.

In some embodiments, the relevant block of the current image block may be a co-located block of the current image block. In some video encoding/decoding standards, the relevant block can be referred to as a collocated block or a corresponding block. The co-located block can be an image block with the same position as the current image block in a same frame, or image blocks with a same position difference from the position of the current image block in a same frame.

The methods for determining the relevant block of the current image block in the TMVP operation and the ATMVP operation can be same or different.

In some embodiments, the methods for determining the relevant block of the current image block in the TMVP operation and the ATMVP operation are same and both include determining an image block at a same position in the above-described temporal neighboring image with a specified position in the current image block as the relevant block of the current image block, or determining an image block at a same position in the above describe temporal neighboring image with a specified position spatial neighboring to the current image block as the relevant block of the current image block.

The ATMVP operation and TMVP operation may include determining the relevant block of the current image block by scanning all spatial candidate motion vectors that have been added to the motion vector merge candidate list. Compared with the existing technologies, the method of the present disclosure can simplify redundant operations in the TMVP operation and the ATMVP operation.

The size of the relevant block of the current image block can be same as the size of the current image block, or the size of the relevant block of the current image block is a default value.

The specified position in the current image block can be any position in the current image block, e.g., any one of an upper left corner point, an upper right corner point, a center point, a lower left corner point, and a lower right corner point of the current image block. The specified position spatial neighboring to the current image block refers to a specified position in the current image other than the current image block, e.g., a specified position neighboring to the current image block.

For example, if the specified position is the upper left corner point of the current image block and the temporal neighboring image has a pixel point at the same position as the upper left corner point of the current image block, an encoded/decoded block where the pixel is located can be determined as the relevant block of the current image block, or an image block with the pixel as the upper left corner point and with a same size as the current image block or a preset size may be determined as the relevant block of the current image block.

In some embodiments where the ATMVP operation is performed, the current image block is a CU, and a sub-block obtained by dividing the current image block can be referred to as a sub-CU. In some embodiments, the size of the sub-block and/or the size of the relevant block of the sub-block are set to be greater than or equal to 64 pixels. In some embodiments, the size of the sub-block and/or the size of the relevant block of the sub-block are both set to 8×8 pixels.

In the ATMVP technology, a frame-level adaptive setting can be performed on the size of the sub-block. The size of the sub-block is 4×4 by default and is set to 8×8 when a specific condition is met. For example, at the encoder side, when the current image block is encoded, an average block size of each sub-block in the CU during a previous encoded image block in a same time domain being encoded in the ATMVP mode is calculated. If the average block size is greater than a threshold, the size of the sub-block of the current image block is set to 8×8, otherwise the default value 4×4 is set. In a new generation versatile video coding (VVC) standard, a motion vector is stored in a size of 8×8. It should be noted that when the size of the sub-block is set to 4×4, the size of the motion vector of the sub-block (also 4×4) does not adapt to a storage granularity of the motion vector in the existing standard. In the ATMVP technology, when the current image block is encoded, size information of the sub-block of the previous encoded image block at the same time domain may also need to be stored.

In the present disclosure, the size of the sub-block of the current image block is set to 8×8, which can adapt to the storage granularity of the motion vector specified in the video standard VVC. On the other hand, the size information of the sub-block of the previous encoded image block does not need to be stored, and hence a storage space can be saved.

It should be noted that, provided that the size of the sub-block and/or the size of the relevant block of the sub-block is set to be equal to 64 pixels, the size of the sub-block and/or the size of the relevant block of the sub-block may have different dimensions. For example, the size of the sub-block and/or the size of the relevant block of the sub-block are A×B, where A≤64, B≤64, and A and B are both integer multiples of 4. Further, for example, the size of the sub-block and/or the size of the relevant block of the sub-block are 4×16 pixels, or 4×16 pixels.

In some embodiments, the storage granularity of the motion vector may not be 8×8, but other values. In some embodiments, the size of the sub-block of the current image block is set to be same as the granularity of the motion vector, which is x×y, and x and y are positive integers.

In some embodiments, the ATMVP operation and the TMVP operation are not performed on each image block. Only when the size of the current image block meets a preset condition, the temporal candidate motion vector of the current image block is determined through the ATMVP operation and/or the TMVP operation.

The preset condition can include one condition or a combination of a plurality of conditions. For example, when the size of the current image block meets a first set of conditions, the temporal candidate motion vector of the current image block is determined through the ATMVP operation. When the size of the current image block meets a second set of conditions, the temporal candidate motion vector of the current image block is determined through the TMVP operation. The number of conditions in the first set of conditions is at least one. The number of conditions in the second set of conditions is at least one. The first set of conditions and the second set of conditions can be completely same, or completely different, or partially same.

In some embodiments, after the temporal candidate motion vector of the current image block is determined, the temporal candidate motion vector is added to a motion vector candidate list of the current image block. For example, the temporal candidate motion vector determined through the ATMVP operation is added to the above-described first motion vector candidate list, and the temporal candidate motion vector determined through the TMVP operation is added to the above-described second motion vector candidate list.

In some embodiments, the size of the current image block is x1×y1, and the default size of the sub-block of the current image block is x2×y2, where x1, x2, y1, and y2 are all positive integers. The preset condition includes x1 being not smaller than x2 and/or y1 being not smaller than y2. For example, when x1 is not smaller than x2 and/or y1 is not smaller than y2, the temporal candidate motion vector of the current image block is determined through the ATMVP operation and/or the TMVP operation.

In some embodiments, when x1 is smaller than or equal to x2 and/or y1 is smaller than or equal to y2, it is set not to perform the ATMVP operation. For example, when the above-described first motion vector candidate list is constructed, none of the added motion vector candidates is determined through the ATMVP operation.

In some embodiments, the size of the current image block is x1×y1, and a preset size is x3×y3, where x1, x3, y1, and y3 are all positive integers. The preset condition includes x1 being not smaller than x3 and/or y1 being not smaller than y3. For example, when x1 is not smaller than x3 and/or y1 is not smaller than y3, the temporal candidate motion vector of the current image block is determined through the ATMVP operation and/or the TMVP operation.

In some embodiments, when x1 is smaller than or equal to x3 and/or y1 is smaller than or equal to y3, it is set not to perform the TMVP operation.

In some embodiments, the storage granularity of the motion vector is x3×y3.

In some embodiments, when the size of the current image block is same as a first default size, only one of the TMVP operation and the ATMVP operation is performed. For example, it is set not to perform the ATMVP operation or not to perform the TMVP operation. For example, only the ATMVP operation is performed. For example, it is set not to perform the TMVP operation. In some embodiments, the first default size may be same as the size of the storage granularity of the motion vector. When the size of the current image block is same as the first default size, the ATMVP technology and the TMVP technology have some redundancy, and both technologies export a set of temporal motion information for the current image block. A redundant operation can be avoided by setting not to perform one of the operations, which can effectively save coding and decoding time. In some embodiments, the ATMVP technology uses a candidate motion vector in an existing merge list of the current image block during exporting. On the other hand, the TMVP technology exports a candidate motion vector directly from a fixed position in a neighboring encoded image. The motion vector exported by the ATMVP technology is more valid and adaptive than the motion vector exported by the TMVP technology, and it is set not to perform the TMVP operation.

In some embodiments, when the current image block contains a storage granularity of one motion vector, that is, when the size of the current image block can cover the storage granularity of one motion vector, the temporal candidate motion vector of the current image block is determined through the ATMVP operation and/or the TMVP operation.

In some embodiments, when the current image block cannot contain the storage granularity of one motion vector or the size of the current image block is equal to the storage granularity of one motion vector, it is set not to perform the TMVP operation. Specifically, the TMVP technology exports a set of temporal motion information, and when the current image block cannot contain the storage granularity of one motion vector, the exported motion vector may be the same, causing an unnecessary division operation.

In some embodiments, the preset condition includes the number of pixels of the current image block is greater than or equal to a preset value. In some embodiments, when the number of pixels of the current image block is smaller than or equal to the preset value, the TMVP operation and/or the ATMVP operation are not performed.

In some embodiments, if a width or a height of a current CU block is smaller than 8, if the width and the height of the current CU block are both equal to 8, and if the width or the height of the current CU block is smaller than 8 or the width and the height of the current CU block are both equal to 8, it is set not to perform the TMVP operation, thereby avoiding the redundant operation and effectively saving coding and decoding time.

In some embodiments, during a process of constructing the second motion vector candidate list of the current image block, the TMVP operation process is turned off, that is, the TMVP technology is not used to determine a temporal candidate motion vector to be added to the second motion vector candidate list. Specifically, other operations related to the temporal motion information are added, e.g., ATMVP operation, history-based motion vector prediction (HMVP)

operation, etc., and an effect of the TMVP technology in the current construction process is greatly reduced, which has a redundancy with the above-described technologies, that is, same motion information may be exported in some cases, causing the construction process of the candidate list to be too complicated and inefficient. In some embodiments, the TMVP process is turned off during a process of constructing the merge candidate motion vector list of the current image block. In this case, temporal related information is still effectively used, and the construction process of the merge candidate list is simpler, thereby reducing complexity of the encoder side and the decoder side.

In a motion compensation prediction process, previous mainstream video coding standards only use a translational motion model. In practice, too many forms of motion exist, e.g., zoom in/out, rotation, long-range motion and other irregular motions. In order to improve an efficiency of inter-frame prediction, an affine motion compensation model may be induced into the coding and decoding technology. The affine motion compensation describes an affine motion field of the image block through MVs of a set of control points. In some embodiments, the affine motion compensation model adopts a four-parameter affine model, and the set of control points includes two control points (e.g., upper left corner point and upper right corner point of the image block). In some embodiments, the affine motion compensation model adopts a six-parameter affine model, and the set of control points includes three control points (e.g., upper left corner point, upper right corner point, and lower left corner point of the image block).

In some embodiments, when the first motion vector candidate list is constructed, the added candidate may be an MV of a set of control points, or referred to as control point motion vector prediction (CPMVP). In some embodiments, the first motion vector candidate list can be used in merge mode. Specifically, the mode may be referred to as affine merge mode, and the first motion vector candidate list can be referred to as affine merge candidate list correspondingly. In the affine merge mode, the prediction in the first motion vector candidate list is directly used as the control point motion vector (CPMV) of the current image block, that is, the affine motion prediction process is not needed.

In some embodiments, a candidate determined according to the ATMVP technology can be added to the first motion vector candidate list.

In some embodiments, a group of control point motion vectors of the relevant block of the current image block is added to the first motion vector candidate list as a candidate. When the candidate in the first motion vector candidate list is used for prediction, the current image block is predicted according to the group of control point motion vectors of the relevant block of the current image block.

In some embodiments, as described above, a representative motion vector of the relevant block of the current image block is added to the first motion vector candidate list as a candidate. Further, in some embodiments, the candidate is marked as determined according to the ATMVP technology. When the candidate in the first motion vector candidate list is used for prediction, the relevant block of the current image block is determined according to the mark and the candidate. The current image block and the relevant block are divided into a plurality of sub-blocks through a same method, and each sub-block in the image block is corresponding to each sub-block in the relevant block. The motion vector of the corresponding sub-block in the current image block is separately predicted according to the motion vector of each sub-block in the relevant block.

In some embodiments, if the relevant block has a sub-block for which a motion vector cannot be obtained, the representative motion vector of the relevant block is used to replace the unobtainable motion vector to predict the corresponding sub-block in the current image block. Further, in some embodiments, if the representative motion vector of the relevant block cannot be obtained, the candidate determined according to the ATMVP technology is abandoned to be added to the second motion vector candidate list. In some embodiments, when the sub-block in the relevant block cannot be obtained, or the sub-block in the relevant block adopts an intra-coding mode, it is determined that the relevant block has a sub-block for which a motion vector cannot be obtained.

In some embodiments, each candidate in the first motion vector candidate list includes motion vectors of a set of control points. When the representative motion vector of the relevant block of the current image block is added to the first motion vector candidate list, in order to ensure that a data format is consistent, the representative motion vector of the relevant block can be inserted as a motion vector of each control point in the candidate, that is, the motion vector of each control point in the candidate is assigned with the representative motion vector of the relevant block.

In some embodiments, the representative motion vector of the relevant block of the current image block may refer to a motion vector of a center position of the relevant block, or other motion vectors representing the relevant block, which is not limited here.

As shown in FIG. 1, there is provided a video image processing method according to one embodiment of the present disclosure. The method includes the following processes.

At S110, a current image block is determined.

At S120, when a size of the current image block meets a preset condition, a temporal candidate motion vector of the current image block is determined according to a temporal motion vector prediction (TMVP) operation and/or an advanced/alternative temporal motion vector prediction (ATMVP) operation.

The TMVP operation includes determining a relevant block of the current image block in a temporal neighboring image, and determining a temporal candidate motion vector of the current image block according to a motion vector of the relevant block.

The ATMVP operation includes determining a relevant block of the current image block in a temporal neighboring image, dividing the current image block into a plurality of sub-blocks, determining a relevant sub-block corresponding to each sub-block in the relevant block, and determining a temporal candidate motion vector of the sub-block of the current image block according to a motion vector of the relevant sub-block corresponding to each sub-block.

The above description may be referred to for the video image processing method shown in FIG. 1, which will not be repeated here.

The method embodiment of the present disclosure is described above with reference to FIG. 1, and the device embodiment corresponding to the method embodiment is described below. It should be noted that the description of the device embodiment and the description of the method embodiment correspond to each other, and the above-described method embodiments can be referred to for contents that are not described in detail, which will not be repeated here for brevity.

Figure 2:
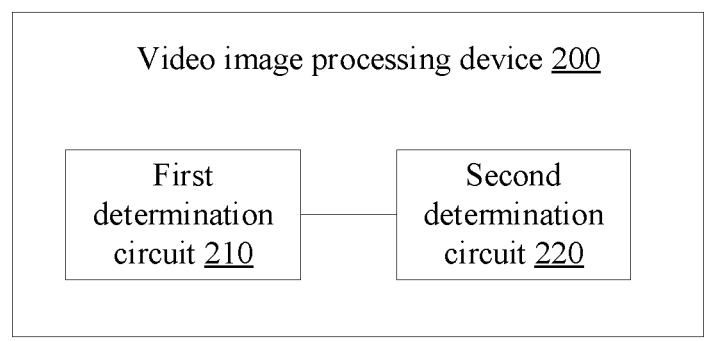
FIG. 2 is a schematic block diagram showing a video image processing device according to one embodiment of the present disclosure.

FIG. 2 is a schematic block diagram showing a video image processing device 200 according to one embodiment of the present disclosure. The device 200 is configured to execute the method embodiment shown in FIG. 1, and includes a first determination circuit 210 and a second determination circuit 220. The first determination circuit 210 is configured to determine a current image block. The second determination circuit 220 is configured to determine a temporal candidate motion vector of the current image block according to a temporal motion vector prediction (TMVP) operation and/or an advanced/alternative temporal motion vector prediction (ATMVP) operation when a size of the current image block meets a preset condition.

The TMVP operation includes determining a relevant block of the current image block in a temporal neighboring image, and determining a temporal candidate motion vector of the current image block according to a motion vector of the relevant block.

The ATMVP operation includes determining a relevant block of the current image block in a temporal neighboring image, dividing the current image block into a plurality of sub-blocks, determining a relevant sub-block corresponding to each sub-block in the relevant block, and determining a temporal candidate motion vector of the sub-block of the current image block according to a motion vector of the relevant sub-block corresponding to each sub-block.

It should be noted that the first determination circuit and the second determination circuit in the embodiment may be implemented by one or more processors.

The embodiments of the present disclosure also provide a video image processing device that may be configured to execute the method embodiments described above. The device includes a processor and a memory. The memory is configured to store program instructions. The processor is configured to execute the program instructions stored in the memory, and the execution of the program instructions causes the processor to perform the method according to the above-described method embodiments.

In some embodiments, the device may also include a communication interface for communicating with an external device. For example, the processor is configured to control the communication interface to receive and/or send a signal.

The device provided in this disclosure can be provided at an encoder or a decoder.

The embodiments of the present disclosure also provide a computer-readable storage medium storing a computer program. The execution of the computer program by a computer causes the computer to perform the method provided in the above-described method embodiments.

In some embodiments, it may be implemented in whole or in part by software, hardware, firmware, or any combination thereof. When implemented in software, it may be implemented in whole or in part in the form of a computer program product including one or more computer instructions. When computer instructions are loaded and executed on a computer, all or part of the processes or functions according to the embodiments of the present disclosure are generated. The computer may be a general-purpose computer, a special purpose computer, a computer network, or other programmable device. Computer instructions may be stored in a computer-readable storage medium or transmitted from one computer-readable storage medium to another computer-readable storage medium. For example, computer instructions can be transmitted from a website, a computer, a server, or a data center to another website, computer, server, or data center through wired (e.g., coaxial cable, optical fiber, digital subscriber line (i.e., DSL)) or wireless (e.g., infrared, wireless, microwave, etc.). A computer-readable storage medium may be any usable media that can be stored and read by a computer or a data storage device such as a server or a data center etc. containing one or more usable media integrations. An usable media can be a magnetic media (e.g., floppy disk, hard disk, magnetic tape), an optical media (e.g., high-density digital video disc, i.e., DVD), or a semiconductor media (e.g., solid state disk, i.e., SSD), etc.

Those skilled in the art can realize that the units and algorithm steps of each example described in connection with the embodiments disclosed herein can be implemented by electronic hardware, or a combination of computer software and electronic hardware. Whether these functions are implemented by hardware or software depends on the specific application and design constraints of the technical solution. Professionals can use different methods to implement the described functions for each specific application, but such implementation should not be considered beyond the scope of this specification.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

The present disclosure has been described with the above embodiments, but the technical scope of the present disclosure is not limited to the scope described in the above embodiments. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the claims.

What is claimed is:

1. A video image processing method comprising:
   determining a current image block;
   in response to a size of the current image block not meeting a first preset condition, skipping an advanced/alternative temporal motion vector prediction (ATMVP) operation so that a temporal candidate motion vector of the current image block is not determined according to the ATMVP operation;
   in response to the size of the current image block not meeting a second preset condition, skipping a temporal motion vector prediction (TMVP) operation so that the temporal candidate motion vector of the current image block is not determined according to the TMVP operation; and encoding the current image block;

wherein the ATMVP operation includes:
    determining a relevant block of the current image block in a temporal neighboring image;
    dividing the current image block into a plurality of sub-blocks;
    for each of the sub-blocks, determining a corresponding relevant sub-block in the relevant block; and
    determining temporal candidate motion vectors of the sub-blocks of the current image block according to motion vectors of the relevant sub-blocks corresponding to the sub-blocks; and
wherein the TMVP operation includes:
    determining the relevant block of the current image block in the temporal neighboring image; and
    determining the temporal candidate motion vector of the current image block according to a motion vector of the relevant block.

2. The method of claim 1, wherein the first preset condition includes at least one of:
    that a number of pixels in a width direction of the current image block is:
        larger than a first preset number, or
        larger than or equal to the first preset number; or
    that a number of pixels in a height direction of the current image block is:
        larger than a second preset number, or
        larger than or equal to the second preset number.

3. The method of claim 2, wherein:
    the first preset number is 8; and/or
    the second preset number is 8.

4. The method of claim 1, wherein at least one of a size of one sub-block or a size of one relevant sub-block is fixed to be larger than or equal to 64 pixels.

5. The method of claim 4, wherein the at least one of the size of the one sub-block or the size of the one relevant sub-block is fixed at 8×8.

6. The method of claim 1, wherein the second preset condition includes that a number of pixels of the current image block is:
    larger than 32, or
    larger than or equal to 32.

7. A video image processing method comprising:
    determining a current image block;
    in response to a size of the current image block not meeting a first preset condition, skipping an advanced/alternative temporal motion vector prediction (ATMVP) operation so that a temporal candidate motion vector of the current image block is not determined according to the ATMVP operation;
    in response to the size of the current image block not meeting a second preset condition, skipping a temporal motion vector prediction (TMVP) operation so that the temporal candidate motion vector of the current image block is not determined according to the TMVP operation; and
    decoding the current image block;
wherein the ATMVP operation includes:
    determining a relevant block of the current image block in a temporal neighboring image;
    dividing the current image block into a plurality of sub-blocks;
    for each of the sub-blocks, determining a corresponding relevant sub-block in the relevant block; and
    determining temporal candidate motion vectors of the sub-blocks of the current image block according to motion vectors of the relevant sub-blocks corresponding to the sub-blocks; and
wherein the TMVP operation includes:
    determining the relevant block of the current image block in the temporal neighboring image; and
    determining the temporal candidate motion vector of the current image block according to a motion vector of the relevant block.

8. The method of claim 7, wherein the first preset condition includes at least one of:
    that a number of pixels in a width direction of the current image block is:
        larger than a first preset number, or
        larger than or equal to the first preset number; or
    that a number of pixels in a height direction of the current image block is:
        larger than a second preset number, or
        larger than or equal to the second preset number.

9. The method of claim 8, wherein:
    the first preset number is 8; and/or
    the second preset number is 8.

10. The method of claim 7, wherein at least one of a size of one sub-block or a size of one relevant sub-block is fixed to be larger than or equal to 64 pixels.

11. The method of claim 10, wherein the at least one of the size of the one sub-block or the size of the one relevant sub-block is fixed at 8×8.

12. The method of claim 7, wherein the second preset condition includes that a number of pixels of the current image block is:
    larger than 32, or
    larger than or equal to 32.

13. A non-transitory computer-readable storage medium storing data that includes coding information related to a video, the coding information being encoded into the data via a process including:
    determining a current image block;
    in response to a size of the current image block not meeting a first preset condition, skipping an advanced/alternative temporal motion vector prediction (ATMVP) operation so that a temporal candidate motion vector of the current image block is not determined according to the ATMVP operation;
    in response to the size of the current image block not meeting a second preset condition, skipping a temporal motion vector prediction (TMVP) operation so that the temporal candidate motion vector of the current image block is not determined according to the TMVP operation; and
    encoding the current image block;
wherein the ATMVP operation includes:
    determining a relevant block of the current image block in a temporal neighboring image;
    dividing the current image block into a plurality of sub-blocks;
    for each of the sub-blocks, determining a corresponding relevant sub-block in the relevant block; and
    determining temporal candidate motion vectors of the sub-blocks of the current image block according to motion vectors of the relevant sub-blocks corresponding to the sub-blocks; and
wherein the TMVP operation includes:
    determining the relevant block of the current image block in the temporal neighboring image; and determining the temporal candidate motion vector of the current image block according to a motion vector of the relevant block.

14. The storage medium of claim 13, wherein the first preset condition includes at least one of:
that a number of pixels in a width direction of the current image block is:
larger than a first preset number, or
larger than or equal to the first preset number; or
that a number of pixels in a height direction of the current image block is:
larger than a second preset number, or
larger than or equal to the second preset number.

15. The storage medium of claim 14, wherein:
the first preset number is 8; and/or
the second preset number is 8.

16. The storage medium of claim 13, wherein at least one of a size of one sub-block or a size of one relevant sub-block is fixed to be larger than or equal to 64 pixels.

17. The storage medium of claim 16, wherein the at least one of the size of the one sub-block or the size of the one relevant sub-block is fixed at 8×8.

\* \* \* \* \*